(12) United States Patent
Holenderski et al.

(10) Patent No.: US 10,237,958 B2
(45) Date of Patent: Mar. 19, 2019

(54) DECISION SUPPORT SYSTEM FOR A LIGHTING NETWORK

(71) Applicant: Philips Lighting Holding B.V., Eindhoven (NL)

(72) Inventors: Leszek Holenderski, Eindhoven (NL); Ingrid Christina Maria Flinsenberg, Eindhoven (NL); Alexandre Georgievich Sinitsyn, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 144 days.

(21) Appl. No.: 14/785,479

(22) PCT Filed: Apr. 21, 2014

(86) PCT No.: PCT/IB2014/060871
§ 371 (c)(1),
(2) Date: Oct. 19, 2015

(87) PCT Pub. No.: WO2014/174426
PCT Pub. Date: Oct. 30, 2014

(65) Prior Publication Data
US 2016/0066398 A1    Mar. 3, 2016

Related U.S. Application Data

(60) Provisional application No. 61/816,188, filed on Apr. 26, 2013.

(51) Int. Cl.
*H05B 37/03* (2006.01)
*H05B 37/02* (2006.01)

(52) U.S. Cl.
CPC ......... *H05B 37/03* (2013.01); *H05B 37/0245* (2013.01); *Y02B 20/72* (2013.01)

(58) Field of Classification Search
CPC ..... H05B 37/0245; H05B 37/03; Y02B 20/72
(Continued)

(56) References Cited

U.S. PATENT DOCUMENTS 5,479,159 A    12/1995  Kelly
8,760,471 B2*  6/2014  Ihara ................... G06F 11/0727
                                                    345/632

(Continued)

FOREIGN PATENT DOCUMENTS

| WO | 2007140779 A1 | 12/2007 |
| WO | 2012143814 A1 | 10/2012 |
| WO | 2013005127 A1 | 1/2013 |

OTHER PUBLICATIONS

"Cities, roads, pathways and city squares. Light Solutions to ensure safety and create a good atmosphere", OSRAM 2012.

*Primary Examiner* — Seokjin Kim

(57) ABSTRACT

A decision support unit for an outdoor lighting network (100) is disclosed. The outdoor lighting network includes a plurality of lighting units (LU1-LU8) grouped in a plurality of zones (30, 31). The decision support unit includes a controller (20) including safety monitor module (23) arranged to determine a safety factor for each of the plurality of zones (30, 31). The safety factor for each the plurality of zones 30, 31 is determined using at least one factor that represents an aspect that contributes to an assessment of each of the plurality of zones' safety. The decision support unit may also include a decision module (24) that determines a repair priority of a faulty lighting unit (LU1-LU8) using the safety factors determined by the safety monitor module (23).

8 Claims, 1 Drawing Sheet

Figure 1:
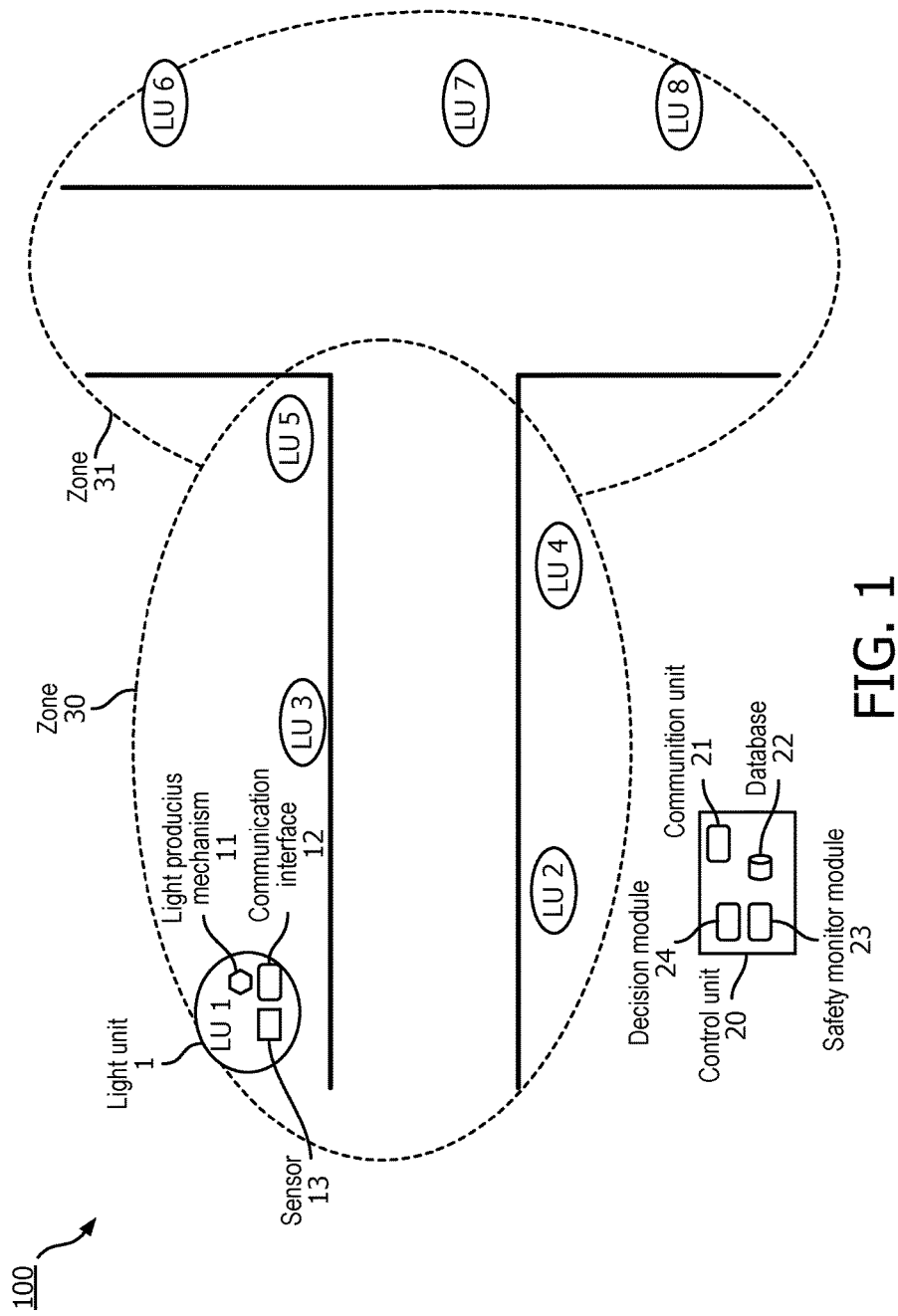

(58) Field of Classification Search
USPC ........ 317/130–133, 119–121, 127, 152–154; 702/150, 58, 64
See application file for complete search history.

(56) References Cited

U.S. PATENT DOCUMENTS

| | | | |
|---|---|---|---|
| 2008/0104454 A1* | 5/2008 | White | H04N 21/2225 714/48 |
| 2008/0147337 A1 | 6/2008 | Walters | |
| 2009/0222223 A1 | 9/2009 | Walters | |
| 2012/0059622 A1* | 3/2012 | Cacace | H05B 37/0272 702/150 |
| 2013/0234862 A1* | 9/2013 | Toth | H04Q 9/00 340/870.03 |
| 2015/0319825 A1* | 11/2015 | Destine | H05B 37/0227 315/153 |
| 2016/0066398 A1* | 3/2016 | Holenderski | H05B 37/0245 315/130 |

* cited by examiner

DECISION SUPPORT SYSTEM FOR A LIGHTING NETWORK

CROSS-REFERENCE TO PRIOR APPLICATIONS

This application is the U.S. National Phase application under 35 U.S.C. § 371 of International Application No. PCT/IB2014/060871, filed on Apr. 21, 2014, which claims the benefit of U.S. Provisional Patent Application No. 61/816,188, filed on Apr. 26, 2013. These applications are hereby incorporated by reference herein.

The present invention relates to a system and method for maintaining the functionality of lighting units and, more particularly, a decision support system that initiates repair of faulty outdoor lighting units using safety factor criteria.

One reason, if not the main reason, for installing an outdoor lighting system is to increase public safety. However, maintainers of such outdoor lighting systems (e.g., a city network of street lamps) do not use variable safety factors in deciding when to replace faulty lighting units e.g., a faulty street lamp. The decision is typically made based on the number of faulty lamps on a street.

The replacement of a faulty street/road/motorway lamp is a complex process because it usually involves blocking the street traffic so that various safety precautions must be arranged. For this reason, the maintainers of such outdoor lighting systems may not replace the faulty lamp immediately, but rather wait until several faulty lamps need to be replaced. This prevents the need to block the street traffic more than once. The decision to replace the faulty lamp is usually triggered if the number of faulty lamps is greater than some predefined constant number.

As noted above, the main purpose of street lighting is to increase safety. Proper working lighting units reduce the likelihood of road traffic accidents for pedestrians, cyclists and vehicle users. It also increases the safety of our environment and property by reducing crime and vandalism. During the period of time when the faulty street lamp is waiting for a replacement, the safety of the area covered by the lighting unit decreases. The criterion of lamp replacement based solely on the number of faulty lamps ignores the safety aspect.

Accordingly, a need exists in the art for systems and methods to address the shortcomings of the conventional systems described above.

One aspect of the present invention is related to augmenting the criterion for replacing the faulty street lamp using a new safety related criterion.

One embodiment of the present invention is directed to a decision support unit for an outdoor lighting network that includes a plurality of lighting units grouped in a plurality of zones. The decision support unit includes a controller including a safety monitor module arranged to determine a safety factor for each of the plurality of zones. The safety factor for each of the plurality of zones is determined using at least one factor that represents an aspect that contributes to an assessment of each of the plurality of zones' safety.

The factor may, for example, represent automobile traffic, pedestrian traffic, crime rate, or automobile accident rate in each of the plurality of zones.

In another embodiment of the present invention, the decision support unit also includes a decision module that determines a repair priority of a faulty lighting unit using the safety factors determined by the safety monitor module.

Another embodiment of the present invention is directed to a device for determining a repair priority for a faulty outdoor lighting unit. The device includes a module for determining the repair priority based upon a number of faulty outdoor lighting units in a preset zone and a safety factor determined for the preset zone. The device also includes an indicator that provides a signal if the repair priority for the faulty outdoor lighting unit reaches a predetermined threshold.

The safety factor, for example, may be real-time adaptively changeable based upon information gathered from an external data source.

Yet another embodiment of the present invention is directed to a method for determining a repair priority for a faulty outdoor lighting unit. The method includes the steps of calculating the repair priority based upon a number of faulty outdoor lighting units in a preset zone and a safety factor determined for the preset zone and determining if the calculated repair priority reaches a predetermined threshold and providing a signal if the repair priority reaches the predetermined threshold.

In general, the various aspects and embodiments of the present invention may be combined and coupled in any way possible within the scope of the invention. The subject matter that is regarded as the invention is particularly pointed out and distinctly claimed in the claims at the conclusion of the specification.

The foregoing and other features and advantages of the invention will be apparent from the following detailed description taken in conjunction with the accompanying drawings.

FIG. 1 shows an outdoor lighting system 100 according to an embodiment of the present invention. The outdoor lighting system 100 includes a control unit 20 (e.g., a service or central maintenance center) and one or more lighting units 1 (LU1-LU8). The LUs (as shown in LU1) include at least a light producing mechanism 11. The LUs may also include a communication interface 12 and one or more sensors 13. The communication interface 12 may be any suitable communication arrangement to transfer data to and/or from the LU1. In this regard, via the communication interface 12, each LU (LU1-LU8) may be in communication with the control unit 20 directly and/or via another LU. The communication interface 12 enables command, control, and monitoring of the LUs.

The LUs (LU1-LU8) are grouped in a plurality of zones 30, 31 as shown in FIG. 1. It is noted that a particular LU may be grouped in more than one zone 30, 31. The plurality of zones 30, 31 may be determined using any factor(s) relevant to planners, maintainer or users of the outdoor lighting system 100. For example, the plurality of zones 30, 31 may cover different geographical areas in a metropolitan area, certain streets in a city or particular locations within a region.

The control unit 20 may be located near or at a remote location from the LUs (LU1-LU8). The central control unit 20 may include a communication unit 21. The control unit 20 may also include a database 22 for storing data, algorithms, software and/or firmware.

The communication unit 21 may be used to communicate with the LUs (LU1-LU8). In this case, the control unit 20 is communicatively coupled to the LUs (LU1-LU8), either directly or indirectly. For example, the control unit 20 may be in direct communication via a wired and/or wireless/wireless-mesh connection or an indirect communication via a network such as the Internet, Intranet, a wide area network (WAN), a metropolitan area network (MAN), a local area network (LAN), a terrestrial broadcast system, a cable network, a satellite network, a wireless network, power line or a telephone network (POTS), as well as portions or combinations of these and other types of networks.

The control unit 20 also includes one or more modules (and/or algorithms) related to maintaining the operation of the LUs (LU1-LU8). In one embodiment of the present invention, the control unit 20 includes two modules (or algorithms), a safety monitor module 23 and a decision module 24. The safety monitor module 23 determines a safety factor for each of the plurality of zones (30, 31). The decision module 24 determines a repair priority for each the LUs (LU1-LU8) that has been determined or reported as faulty using the safety factors from the safety monitor module 23.

In a preferred embodiment, the safety monitor module 23 determines the safety factor for each of the plurality of zones 30, 31 according to the following formula:

$$\text{SafetyFactor}_z = (\text{LampDensity}_z/\text{AverageLampDensity})\\ *(\text{CarTraffic}_z/\text{AverageCarTraffic})*(\text{Pedestrian-}\\ \text{Traffic}_z/\text{AveragePeopleTraffic})*(\text{CrimeRate}_z/\\ \text{AverageCrimeRate})*(\text{CarAccidents}_z/\\ \text{AverageCarAccidents})*$$

As discussed below, in other embodiments of the present invention, variations of the above formula may be used to compute the safety factor. All variables indexed by Z (e.g., SafetyFactor$_z$, and LampDensity$_z$) express a quantity characteristic for a particular zone 30, 31, while variables whose name starts with Average (e.g., AverageLampDensity and AverageCarTraffic) express a quantity characteristic for a larger area or the outdoor lighting network 100 as a whole.

In the formula shown above, the safety factor for each the plurality of zones 30, 31 is determined using one or more a plurality of factors. The plurality of factors capture/represent aspects (e.g., car traffic, pedestrian traffic, crime rate, car accident rate, etc.) that typically contribute to the assessment of a zone's safety. The designers of the outdoor lighting system 100 may include as many or additional factors as deemed relevant or necessary.

Each of the plurality of factors has the form Qz/AverageQ (for quantity Q) and it measures how a zone Z deviates from an average as far as aspect Q is concerned. The average may relate to a city, a region or particular area of reference.

For example, LampDensity$_z$/AverageLampDensity is above 1 if the zone Z contains more LUs (per area) than the average density of lighting unit (LU1-LU8) in the region, city, etc. This particular factor captures the observation that the designers of the outdoor lighting system 100 put more lighting units (LU1-LU8) in non-safe zones, so if this particular factor is above 1, this zone is less safe, on average, than other zones. On the other hand, if it is below 1 then this zone is safer, on average, than the other zones. In summary, if SafetyFactor$_z$ is 1 then zone Z is an average zone. If it is above 1 then zone Z is less safe than the average zone. If it is below 1 then zone Z is safer than the average zone.

All variables needed to compute SafetyFactor$_z$ can either be measured or are already available from some public sources. For example, lamp density can be obtained (with the help of simple calculations) from data collected by the Philips StarSense system that provides GPS position of each monitored lamp pole. Car traffic and people traffic can be estimated from close circuit cameras located in the area. Crime rate and car accidents are recorded by Police.

In another embodiment, the safety monitor module 23 and the decision module 24 may functionally be separate units. For example, the safety monitor module 23 may be a resource that is shared by one or more of the control unit(s) 20.

The decision module determines a replacement priority for each of the plurality of zones 30, 31, according to the following formula:

$$\text{ReplacementPriority}_z = \text{FaultyLamps}_z * \text{SafetyFactor}_z$$

FaultyLamps$_z$ represent the number of faulty lighting units (LU1-LU8) in the zone Z. In this formula, the replacement priority for the zone Z grows if the number of faulty lighting units (LU1-LU8) in the zone Z increases and/or the safety of the zone Z decreases.

If the ReplacementPriority$_z$ reaches a predetermined threshold, the decision module 24 signals (e.g., to a human operator) that the faulty lighting unit (LU1-LU8) in the zone Z should be replaced/repaired.

The present invention may also utilize the fact that the outdoor lighting networks 100 are increasingly becoming intelligent, with sensors, actuators and cameras in the lighting unit/pole installations that can respectively detect the presence of objects and/or emergency situations and communicate relevant information to the control unit 20. In this regard, the control unit 20 may also be communicatively coupled to other systems or networks such as the emergency 911 system. Information gather/collected from these sources can be used to update and/or adaptively change the plurality of safety factors discussed above.

The foregoing detailed description has set forth a few of the many forms that the invention can take. The above examples are merely illustrative of several possible embodiments of various aspects of the present invention, wherein equivalent alterations and/or modifications will occur to others skilled in the art upon reading and understanding of the present invention and the annexed drawings. In particular, regard to the various functions performed by the above described components (devices, systems, and the like), the terms (including a reference to a "means") used to describe such components are intended to correspond, unless otherwise indicated to any component, such as hardware or combinations thereof, which performs the specified function of the described component (i.e., that is functionally equivalent), even though not structurally equivalent to the disclosed structure which performs the function in the illustrated implementations of the disclosure.

The principles of the present invention are implemented as any combination of hardware, firmware, algorithm, module and software. These components may be implemented as an application program on a program storage unit or computer readable storage medium consisting of parts, or of certain devices and/or a combination of devices. The application program may be uploaded to, and executed by, a machine comprising any suitable architecture. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

Although a particular feature of the present invention may have been illustrated and/or described with respect to only one of several implementations, such feature may be combined with one or more other features of the other implementations as may be desired and advantageous for any given or particular application. Furthermore, references to singular components or items are intended, unless otherwise specified, to encompass two or more such components or items. Also, to the extent that the terms "including", "includes", "having", "has", "with", or variants thereof are used in the detailed description and/or in the claims, such terms are intended to be inclusive in a manner similar to the term "comprising".

The present invention has been described with reference to the preferred embodiments. However, modifications and alterations will occur to others upon reading and understanding the preceding detailed description. It is intended that the present invention be construed as including all such modifications and alterations. It is only the claims, including all equivalents that are intended to define the scope of the present invention.

The invention claimed is:

1. A decision support unit for an outdoor lighting network including a plurality of lighting units grouped in a plurality of zones, wherein the at least one of the lighting units having a sensor, the decision support unit comprising:
   a controller in communication with the plurality of lighting units and a network resource, the controller including safety monitor module arranged to determine a safety factor for each of the plurality of zones, wherein the safety factor is determined using a plurality of information from the sensor and/or the network resource, wherein the safety monitor module determines an average safety factor using all of the safety factors for each of the plurality of zones; wherein the safety factor for each of the plurality of zones is determined using at least one factor that represents an aspect that contributes to an assessment of each of the plurality of zones' safety, and
   a decision module to determine a predetermined action related to respective zones based on a predetermined deviation from the average safety factor of each respective safety factor, wherein the predetermined action includes determining a repair priority of a faulty lighting unit, wherein the repair priority is based on a number of faulty outdoor lighting units in a zone and the predetermined deviation.

2. The decision support unit according to claim 1, wherein the at least one factor represents automobile traffic, pedestrian traffic, crime rate, or automobile accident rate in each of the plurality of zones.

3. The decision support unit according to claim 2, wherein the at least one factor is real-time adaptively changeable based upon information gathered from an external data source.

4. The decision support unit according to claim 1, wherein the plurality of zones represent a plurality of streets in a city and the average safety factor represents an average safety factor for the city.

5. The decision support unit according to claim 1, wherein the decision module also uses a number of faulty lighting unit in a particular zone to determine the repair priority.

6. A device for determining a repair priority for a faulty outdoor lighting unit from a plurality of lighting units, wherein the at least one of the plurality of lighting units having a sensor, the device comprising:
   a module in communication with the plurality of lighting units and a network resource, the module for determining the repair priority based upon a number of faulty outdoor lighting units in preset zones and a safety factor determined for the preset zones, wherein the safety factor is determined using information from sensor and/or the network resource, wherein the module determines an average safety factor using all of the safety factors for each preset zone; and
   generating a repair priority signal to a maintenance center, when the repair priority for the faulty outdoor lighting unit reaches a predetermined deviation threshold for a preset zone based on the average safety factor.

7. The device according to claim 6, wherein the safety factor represents one or more attributes related to the preset zone's including one or more of the following automobile traffic, pedestrian traffic, crime rate, and/or automobile accident rate.

8. The device according to claim 6, wherein the safety factor is real-time adaptively changeable based upon information gathered from an external data source.

* * * * *